Sept. 7, 1965  A. WEITZNER  3,204,833
NEVER OPEN CONTAINER WITH A DISPENSING AND MEASURING DEVICE
Filed Feb. 18, 1964  2 Sheets-Sheet 1

INVENTOR.
Adolph Weitzner
BY Polachek & Saulsbury
ATTORNEYS.

Sept. 7, 1965   A. WEITZNER   3,204,833
NEVER OPEN CONTAINER WITH A DISPENSING AND MEASURING DEVICE
Filed Feb. 18, 1964   2 Sheets-Sheet 2
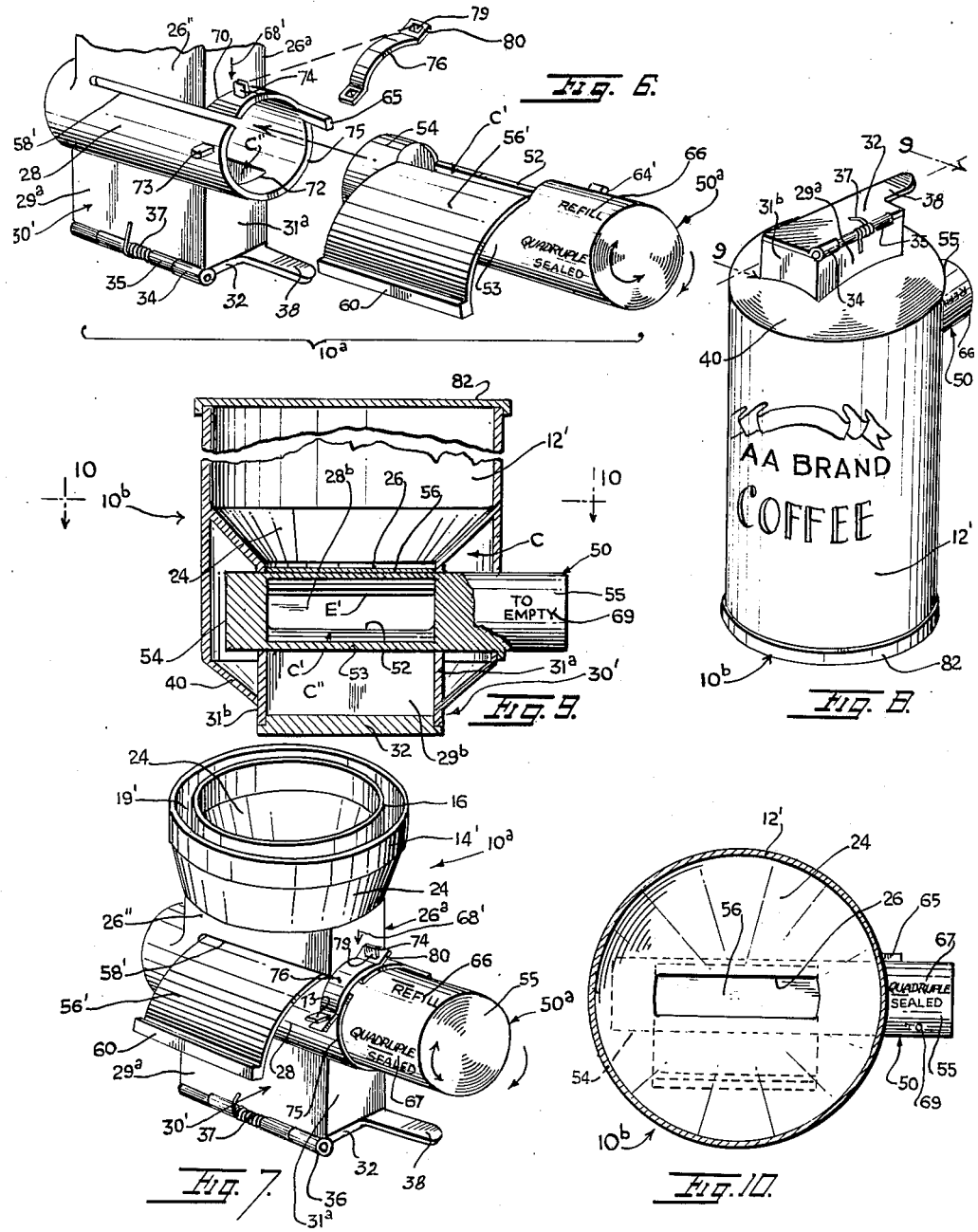
INVENTOR.
Adolph Weitzner
BY
Polachek & Saulsbury
ATTORNEYS.

United States Patent Office 3,204,833
Patented Sept. 7, 1965

3,204,833
NEVER OPEN CONTAINER WITH A DISPENSING AND MEASURING DEVICE
Adolph Weitzner, 752 W. End Ave., New York, N.Y.
Filed Feb. 18, 1964, Ser. No. 345,736
15 Claims. (Cl. 222—355)

This invention relates to a dispensing device for granular materials.

One object of the invention is to provide a device for maintaining a quantity of powdered or granular material such as coffee in a hermetically sealed condition and for repeatedly dispensing a measured quantity of the granular material while keeping the remainder of the material in a hermetically sealed condition.

Another object is to provide a granular material container with a dispensing device as described.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 6 is an exploded perspective view of parts of another dispensing device according to the invention.

FIG. 7 is a perspective view of an assembled dispensing device employing the parts of FIG. 6.

FIG. 8 is a perspective view of a coffee container and dispenser in an inverted position.

FIG. 9 is an enlarged vertical, longitudinal sectional view taken on line 9—9 of FIG. 8, part being broken away.

FIG. 10 is a horizontal, cross-sectional view taken on line 10—10 of FIG. 9.

Figure 1:
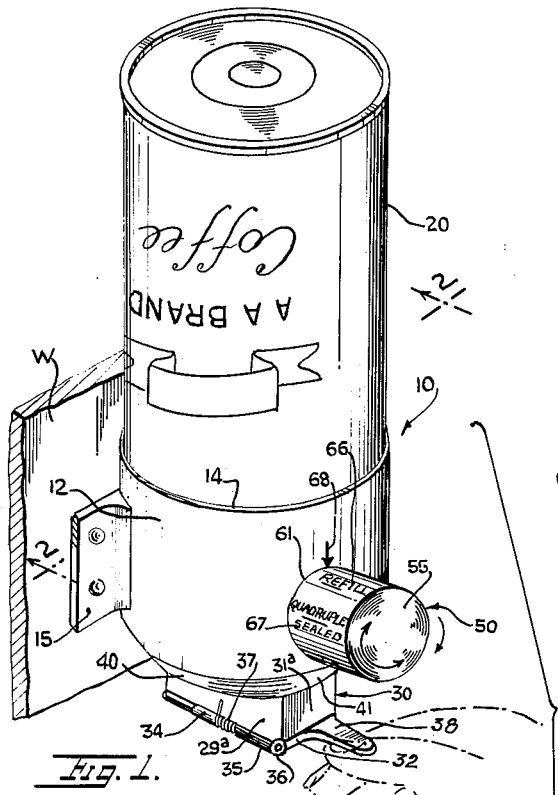
FIG. 1 is a perspective view of a device embodying the invention, shown with a coffee container mounted thereon, and with the device shown in refilling position.

Referring to the drawings, there is shown in FIGS. 1–5, a dispensing device 10 for granular material M such as ground coffee. The device includes an outer cylindrical casing 12 held on wall W by brackets 15. At the upper end 14 of the casing is a cylindrical flange 16 inside the casing end 14 and supported thereby. A circumferential groove 19 is defined between flange 16 and casing end 14 to define a seat for the open end of a cylindrical container 20 inverted over the device; see FIG. 2. The granular coffee M is discharged from container 20 into a funnel or hopper 24 integral with and depending axially from flange 16. The funnel terminates at its lower end in a rectangular neck 26. The funnel 24 is generally oval and of diminishing length and width in cross section so that it provides a smooth passage for the granular material from the cylindrical flange 16 to the rectangular neck 26. Integral with neck 26 is a pair of cylindrically curved opposing plates 28a, 28b. The concave sides of the plates face each other. Upper edges of the plates are integral with bottom lateral edges of the neck, and lower edges of the plates are integral with upper edges of opposing flat, rectangular walls 29a, 29b of a rectangular spout 30.

Spout 30 has front and rear opposing flat walls 31a, 31b integral with front and rear edges respectively of side walls 29a, 29b. The bottom end of spout 30 is open. Upper edges 33 of walls 31a, 31b are concave. Secured in the bottom open end of the spout is a closure plate or door 32. The door is supported by interfitted hinge members 34, 35 on the door and bottom end of side wall 29a, a pin 36 extending through the hinges, and a coil spring 37 which has opposite ends engaged on the underside of the door and side wall 29a. The spring keeps the door in a normally closed position. A handle 38 extends outwardly or forwardly from the front edge of the door. This handle can be pressed downwardly as viewed in FIG. 1 to open the door.

Connected to the circular bottom edge of casing 12 is a tapered connecting section 40 which is generally oval and of diminishing length and width in cross section. Section 40 terminates in a flange 41 around the spout 30. A sealed compartment C is thus defined inside of casing 12 around the funnel 24, neck 26, plates 28a, 28b and upper end portion of spout 30.

A cylindrical measuring and sealing rotor 50 is rotatably disposed in the casing 12. The rotor 50 has a cylindrical cavity C′ formed thereon. Rotor 50 has a lateral rectangular opening 52 in its cylindrical side wall 53. The cavity C′ is defined between the forward end of circular rear end wall 54, the rear end of cylindrical handle or knob 55, and the inside of wall 53. Secured to one edge E of opening 52 on a wall 53 is edge E′ of a flexible plate 56. This plate extends laterally through a slot 58 provided in the upper end of plate 28a near the bottom end of side wall 26′ of neck 26. A ridge 60 may be provided on the outer edge of plate 56.

When the device is assembled, the cylindrical member 50, without plate 56, can be inserted axially through a lateral circular opening 61 in casing 12. At this time connecting section 40 is not yet attached to the bottom edge of casing 12. Then the plate 56 is inserted through the bottom end of casing 12 and the edge E′ is inserted through slot 58. The rotor 50 is rotated to expose edge E at the bottom of neck 26, and the edge E′ of plate 56 is then secured by crimping edge E′ around edge E. Then the connecting section 40 is secured by welding to the bottom end of the casing 12 and flange 41 is formed around and attached to spout 30. The plate 56 prevents the rotor 50 from being removed from the device. However, access can be had to compartment C for cleaning by turning the knob 55 so that compartment opening 52 is exposed either to the neck 26 as shown in FIG. 2 or to the compartment C″ defined by the walls of spout 30 as shown in FIG. 3.

Figure 2:
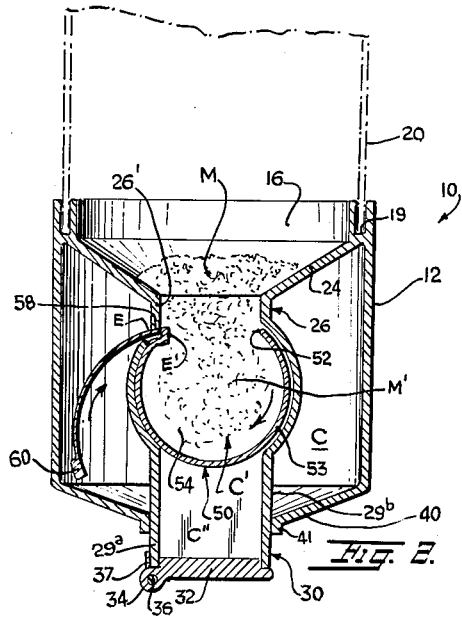
FIG. 2 is a vertical sectional view of the device taken on line 2—2 of FIG. 1.
Figure 3:
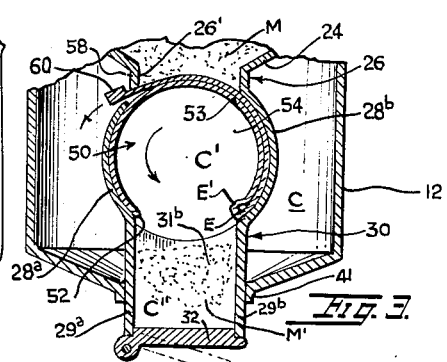
FIG. 3 is a sectional view similar to a part of FIG. 2, showing the device in dispensing position.

The rotor 50 can be rotated between the extreme positions of FIGS. 2 and 3. When the rotor 50 is rotated to its extreme counterclockwise position as shown in FIGS. 1 and 2, the opening 52 is aligned with the neck 26 so that the granular material M is discharged into compartment C′. Compartment C′ is shown filled with a measured quantity of material M′. The rotor 50 is provided with a projection 64 which extends radially outward of the knob handle 55 and engages the bottom edge of a finger 65 which extends radially outward of the casing at opening 61. The member is then in REFILL position as indicated by the legend 66 on the knob handle aligned with arrow 68 on the casing as shown in FIG. 1.

When the rotor 50 is rotated to the other extreme position of FIG. 3, the opening 52 is aligned with spout 30 and the measured quantity of material M′ is discharged into compartment C″. At this position of rotor 50, the bottom end of the neck 26 is closed by the plate 56 overlaying part of compartment wall 53. The ridge 60 then serves as a stop element by abutment with wall 26′ of neck 26 at slots 58. This is the EMPTY position of rotor 50 as indicated by the legend 69 on knob handle 55.

Granular material M' can be discharged from compartment C'' into a percolator basket B or other coffee brewing device by opening door 32 as indicated in FIGS. 1 and 3.

Figure 5:
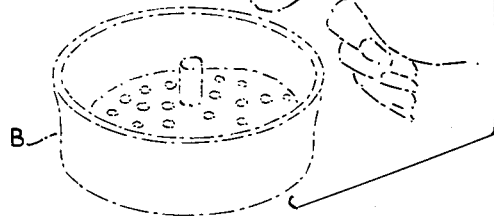
FIG. 5 is a vertical sectional view taken on line 5—5 of FIG. 4.
Figure 5:
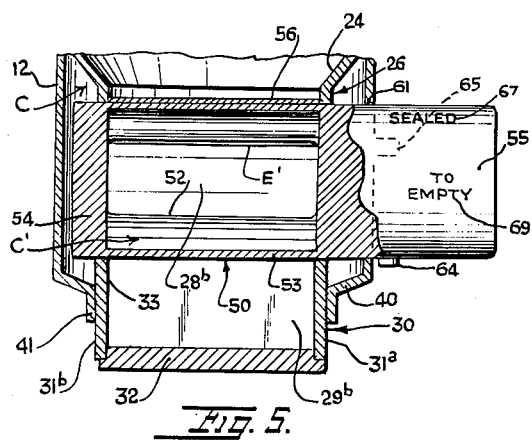
Figure 4:
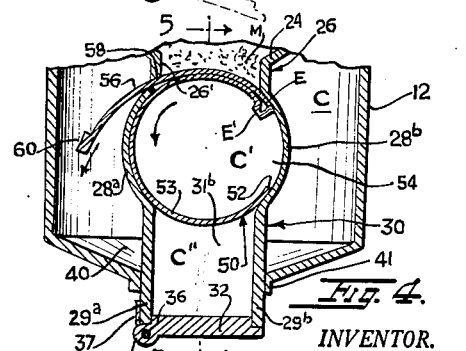
FIG. 4 is a sectional view similar to a part of FIG. 2 showing the device in sealed position.

Rotor 50 can be rotated to a QUADRUPLE SEALED position which is intermediate between the REFILL and EMPTY positions, as shown in FIGS. 4 and 5. The opening 52 is then closed by side plate 28b. Plate 56 overlays part of wall 53, and part of plate 56 extends outwardly of plate 28a. The QUADRUPLE SEALED legend 67 on the knob handle is then aligned with arrow 68. In this position of the rotor 50, the material M in the container is closed off from the compartment C' by a first seal provided at the bottom of neck 26 by part of wall 53 and part of plate 56. A second seal is provided at the base of funnel 26 by the upper portions of wall 53. A third seal is provided at the top of spout 30 or the top of compartment C'' by the lower portions of wall 53. The closed door 32 provides a fourth seal at the bottom of compartment C''. The rotor 50 should normally be in the intermediate or QUADRUPLE SEALED position for keeping the contents of the container hermetically sealed and isolated from outside air which would otherwise quickly degrade its flavor, aroma and freshness.

FIGS. 6 and 7 show another dispensing device 10a which is similar to device 10 and corresponding parts are identically numbered. In device 10a, casing 12 of device 10 is omitted. Spaced concentric cylindrically flanges 14' and 16 define therebetween circumferential groove 19' for receiving the open end 20 of cylindrical container 22. Funnel 24 is secured to the upper end of neck 26a. Neck 26a is secured at its lower end in a rectangular opening 70 of a cylindrical shell 28. This shell has a bottom opening 72. The upper end of spout 30' is secured to shell 28 at opening 72. Door 32 is hinged to the bottom end of spout 30' and is normally held closed by spring 37. The door has handle 38 for opening the door to discharge a measured quantity of granular material from the spout.

The flexible plate 56 is secured at one edge of opening 52 in wall 53 of compartment C' in rotor 50a. Slot 58' is formed in shell 28 at the bottom end of side wall 26'' of neck 26a. The slot extends forwardly out to the front edge 75 of the shell. Thus the rotor 50a can be inserted axially into shell 28 while plate 56' slides into slot 58'.

Two radially extending lugs 73, 74 are formed on shell 28 near opposite edges of slot 58' near edge 75. A curved strap 76 having holes at opposite flat ends 80 engages on the lugs as shown in FIGS. 6 and 7.

Radially extending projection 64' on rotor handle 55 engages underneath finger 65' extending forwardly from edge 75 of the shell, when the rotor is in REFILL position. The REFILL legend 66 will then be aligned with arrow 68' on the front wall of neck 26a and the rotor compartment C' will be open at the top communicating with funnel 24. When the rotor 50a is in QUADRUPLE SEALED position, the plate 56' will be partially wrapped around the rotor and the rotor compartment C' will be closed at top and bottom. When the rotor 50a is in EMPTY position, the compartment will be closed at the top by plate 56a and wall 53 and will be open at the bottom communicating with compartment C'' in spout 30'.

A container of granular material can thus be seated in an inverted position in groove 19' for discharging the granular material through the funnel 24 into the rotor compartment C' in a measured amount. The bottom of the funnel will be closed in the EMPTY and QUADRUPLE SEALED positions of the rotor.

FIGS. 8–10 show a dispenser device 10b which is substantially the same as device 10 and corresponding parts are identically numbered. Device 10b has an elongated casing 12' serving as a container. A removable cover 82 is provided on the top of the container so that it can be refilled.

In all forms of the invention, the contents of the container are hermetically sealed at all times so that the freshness, flavor and aroma of the granular contents will be retained. Although the invention is especially directed at dispensing devices for coffee, it will be understood that the devices can be used for dispensing other granular materials such as tea, powdered milk, cereals, sugar, baking powder, spices, and other granular and powdered substances and materials which should not be exposed to air while they are stored in their containers, or while they are being discharged from their containers into the measuring and dispensing rotors.

The several parts of the dispenser can be made of metal, plastic, fiberboard and composition materials.

While I have illustrated and described the preferred embodiment of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A dispensing device for granular material, comprising a conical funnel for receiving said material from a container thereof, a rectangular neck connected to the funnel, a rectangular spout for discharging said material, curved plate means connecting said spout and neck, a cylindrical rotor rotatably engaged by said plate means and disposed axially perpendicular to said funnel, neck and spout, said rotor having a cylindrical wall defining a compartment with a lateral opening therein, a flexible plate having one edge secured to one edge of said lateral opening, said plate means having a lateral slot, said flexible plate extending through said slot with a ridge on the other end of said plate outside of said compartment and plate means, said rotor having a knob handle extending axially outward of said plate means for manually turning the rotor, whereby said compartment is open to said funnel and neck to receive a predetermined quantity of granular material into said compartment in a first position of the rotor while said cylindrical wall seals off said compartment from said spout, whereby the compartment is closed off from said neck and funnel by said flexible plate overlaying said wall in a second position of said rotor while the compartment is open to said spout to discharge said quantity of material into the spout, and whereby said compartment is closed off from said spout by said wall and is closed off from said neck and funnel by said flexible plate overlaying said wall in a third position of said rotor.

2. A dispensing device for granular material, comprising a conical funnel for receiving said material from a container thereof, a rectangular neck connected to the funnel, a rectangular spout for discharging said material, curved plate means connecting said spout and neck, a cylindrical rotor rotatably engaged by said plate means and disposed axially perpendicular to said funnel, neck and spout, said rotor having a cylindrical wall defining a compartment with a lateral opening therein, a flexible plate having one edge secured to one edge of said lateral opening, said plate means having lateral slot, said flexible plate extending through said slot with a ridge on the other end of said plate outside of said compartment and plate means, said rotor having a knob handle extending axially outward of said plate means for manually turning the rotor, whereby said compartment is open to said funnel and neck to receive a predetermined quantity of granular material into said compartment in a first position of the rotor while said cylindrical wall seals off said compartment from said spout, whereby the compartment is closed off from said neck and funnel by said flexible plate overlaying said wall in a second position of said rotor while the compartment is open to said spout to discharge said quantity of material into the spout, and whereby said compartment is closed off from said spout by said wall and is closed off from said neck and funnel by said flexible plate overlaying said wall in a third position of said rotor, said knob handle having a projection for engaging a stationary member in said first position of the rotor to limit rotation thereof in one direction, said ridge engaging said plate means at said slot in said second position of the rotor to limit rotation thereof in an opposite direction.

3. A dispensing device for granular material, comprising a conical funnel for receiving said material from a container thereof, a rectangular neck connected to the funnel, a rectangular spout for discharging said material, curved plate means connecting said spout and neck, a cylindrical rotor rotatably engaged by said plate means and disposed axially perpendicular to said funnel, neck and spout, said rotor having a cylindrical wall defining a compartment with a lateral opening therein, a flexible plate having one edge secured to one edge of said lateral opening, said plate means having a lateral slot, said flexible plate extending through said slot with a ridge on the other end of said plate outside of said compartment and plate means, said rotor having a knob handle extending axially outward of said plate means for manually turning the rotor, whereby said compartment is open to said funnel and neck to receive a predetermined quantity of granular material into said compartment in a first position of the rotor while said cylindrical wall seals off said compartment from said spout, whereby the compartment is closed off from said neck in a second position of said rotor while the compartment is open to said spout to discharge said quantity of said material into the spout, and whereby said compartment is closed off from said spout by said wall and is closed off from said neck and funnel by said flexible plate overlaying said wall in a third position of said rotor, and a spring-biased door hinged to the spout for closing the same, whereby said quantity of material can be discharged from said spout while the rotor is in said second position.

4. A dispensing device for granular material, comprising a conical funnel for receiving said material from a container thereof, a rectangular neck connected to the funnel, a rectangular spout for discharging said material, curved plate means connecting said spout and neck, a cylindrical rotor rotatably engaged by said plate means and disposed axially perpendicular to said funnel, neck and spout, said rotor having a cylindrical wall defining a compartment with a lateral opening therein, a flexible plate having one edge secured to one edge of said lateral opening, said plate means having a lateral slot, said flexible plate extending through said slot with a ridge on the other end of said plate outside of said compartment and plate means, said rotor having a knob handle extending axially outward of said plate means for manually turning the rotor, whereby said compartment is open to said funnel and neck to receive a predetermined quantity of granular material into said compartment in a first position of the rotor while said cylindrical wall seals off said compartment from said spout, whereby the compartment is closed off from said neck and funnel by said flexible plate overlaying said wall in a second position of said rotor while the compartment is open to said spout to discharge said quantity of said material into the spout, and whereby said compartment is closed off from said spout by said wall and is closed off from said neck and funnel by said flexible plate overlaying said wall in a third position of said rotor, and a spring-biased door hinged to the spout for closing the same, whereby said quantity of material can be discharged from said spout while the rotor is in said second position, said knob handle having a projection for engaging a stationary member in said first position of the rotor to limit rotation thereof in one direction, said ridge engaging said plate means at said slot in said second position of the rotor to limit rotation thereof in an opposite direction.

5. A dispensing device for granular material, comprising a conical funnel for receiving said material from a container thereof, a rectangular neck connected to the funnel, a rectangular spout for discharging said material, curved plate means connecting said spout and neck, a cylindrical rotor rotatably engaged by said plate means and disposed axially perpendicular to said funnel, neck and spout, said rotor having a cylindrical wall defining a compartment with a lateral opening therein, a flexible plate having one edge secured to one edge of said lateral opening, said plate means having a lateral slot, said flexible plate extending through said slot with a ridge on the other end of said plate outside of said compartment and plate means, said rotor having a knob handle extending axially outward of said plate means for manually turning the rotor, whereby said compartment is open to said funnel and neck to receive a predetermined quantity of granular material into said compartment in a first position of the rotor while said cylindrical wall seals off said compartment from said spout, whereby the compartment is closed off from said neck and funnel by said flexible plate overlaying said wall in a second position of said rotor while the compartment is open to said spout to discharge said quantity of material into the spout, and whereby said compartment is closed off from said spout by said wall and is closed off from said neck and funnel by said flexible plate overlaying said wall in a third position of said rotor, and a cylindrical casing surrounding said funnel, neck, plate means and part of said spout to define therewith another compartment external of the rotor for hermetically sealing off the compartment in the rotor from the exterior of the casing.

6. A dispensing device for granular material, comprising a conical funnel for receiving said material from a container thereof, a rectangular neck connected to the funnel, a rectangular spout for discharging said material, curved plate means connecting said spout and neck, a cylindrical rotor rotatably engaged by said plate means and disposed axially perpendicular to said funnel, neck and spout, said rotor having a cylindrical wall defining a compartment with a lateral opening therein, a flexible plate having one edge secured to one edge of said lateral opening, said plate means having a lateral slot, said flexible plate extending through said slot with a ridge on the other end of said plate outside of said compartment and plate means, said rotor having a knob handle extending axially outward of said plate means for manually turning the rotor, whereby said compartment is open to said funnel and neck to receive a predetermined quantity of granular material into said compartment in a first position of the rotor while said cylindrical wall seals off said compartment from said spout, whereby the compartment is closed off from said neck and funnel by said flexible plate overlying said wall in a second position of said rotor while the compartment is open to said spout to discharge said quantity of material into the spout, and whereby said compartment is closed off from said spout by said wall and is closed off from said neck and funnel by said flexible plate overlaying said wall in a third position of said rotor, and a cylindrical casing surrounding said funnel, neck, plate means and part of said spout to define therewith another compartment external of the rotor for hermetically sealing off the compartment in the rotor from the exterior of the casing, said casing extending axially upward from said funnel to define a container for said granular material.

7. A dispensing device for granular material, comprising a conical funnel for receiving said material from a container thereof, a rectangular neck connected to the funnel, a rectangular spout for discharging said material, curved plate means connecting said spout and neck, a cylindrical rotor rotatably engaged by said plate means and disposed axially perepndicular to said funnel, neck and spout, said rotor having a cylindrical wall defining a compartment with a lateral opening therein, a flexible plate having one edge secured to one edge of said lateral opening, said plate means having a lateral slot, said flexible plate extending through said slot with a ridge on the other end of said plate outside of said compartment and plate means, said rotor having a knob handle extending axially outward of said plate means for manually turning the rotor, whereby said compartment is open to said funnel and neck to receive a predetermined quantity of granular material into said compartment in a first position of the rotor while said cylindrical wall seals off said compartment from said spout, whereby the compartment is closed off from said neck and funnel by said flexible plate overlaying said wall in a second position of said rotor while the compartment is open to said spout to discharge said quantity of material into the spout, and whereby said compartment is closed off from said spout by said wall and is closed off from said neck and funnel by said flexible plate overlaying said wall in a third position of said rotor, said knob handle having a projection for engaging a stationary member in said first position of the rotor to limit rotation thereof in one direction, said ridge engaging said plate means at said slot in said second position of the rotor to limit rotation thereof in an opposite direction, and a cylindrical casing surrounding said funnel, neck, plate means and part of said spout to define therewith another compartment external of the rotor for hermetically sealing off the compartment in the rotor from the exterior of the casing.

8. A dispensing device for granular material, comprising a conical funnel for receiving said material from a container thereof, a rectangular neck connected to the funnel, a rectangular spout for discharging said material, curved plate means connecting said spout and neck, a cylindrical rotor rotatably engaged by said plate means and disposed axially perpendicular to said funnel, neck and spout, said rotor having a cylindrical wall defining a compartment with a lateral opening therein, a flexible plate having one edge secured to one edge of said lateral opening, said plate means having a lateral slot, said flexible plate extending through said slot with a ridge on the other end of said plate outside of said compartment and plate means, said rotor having a knob handle extending axially outward of said plate means for manually turning the rotor, whereby said compartment is open to said funnel and neck to receive a predetermined quantity of granular material into said compartment in a first position of the rotor while said cylindrical wall seals off said compartment from said spout, whereby the compartment is closed off from said neck and funnel by said flexible plate overlaying said wall in a second position of said rotor while the compartment is open to said spout to discharge said quantity of said material into the spout, and whereby said compartment is closed off from said spout by said wall and is closed off from said neck and funnel by said flexible plate overlaying said wall in a third position of said rotor, and a spring-biased door hinged to the spout for closing the same, whereby said quantity of material can be discharged from said spout while the rotor is in said second position, and a cylindrical casing surrounding said funnel, neck, plate means and part of said spout to define therewith another compartment external of the rotor for hermetically sealing off the compartment in the rotor from the exterior of the casing.

9. A dispensing device for granular material, comprising a conical funnel for receiving said material from a container thereof, a rectangular neck connected to the funnel, a rectangular spout for discharging said material, curved plate means connecting said spout and neck, a cylindrical rotor rotatably engaged by said plate means and disposed axially perpendicular to said funnel, neck and spout, said rotor having a cylindrical wall defining a compartment with a lateral opening therein, a flexible plate having one edge secured to one edge of said lateral opening, said plate means having a lateral slot, said flexible plate extending through said slot with a ridge on the other end of said plate outside of said compartment and plate means, said rotor having a knob handle extending axially outward of said plate means for manually turning the rotor, whereby said compartment is open to said funnel and neck to receive a predetermined quantity of granular material into said compartment in a first position of the rotor while said cylindrical wall seals off said compartment from said spout, whereby the compartment is closed off from said neck and funnel by said flexible plate overlaying said wall in a second position of said rotor while the compartment is open to said spout to discharge said quantity of said material into the spout, and whereby said compartment is closed off from said spout by said wall and is closed off from said neck and funnel by said flexible plate overlaying said wall in a third position of said rotor, and a spring-biased door hinged to the spout for closing the same, whereby said quantity of material can be discharged from said spout while the rotor is in said second position, said knob handle having a projection for engaging a stationary member in said first position of the rotor to limit rotation thereof in one direction, said ridge engaging said plate means at said slot in said second position of the rotor to limit rotation thereof in an opposite direction, and a cylindrical casing surrounding said funnel, neck, plate means and part of said spout to define therewith another compartment external of the rotor for hermetically sealing off the compartment in the rotor from the exterior of the casing.

10. A dispensing device for granular material, comprising a conical funnel for receiving said material from a container thereof, a rectangular neck connected to the funnel, a rectangular spout for discharging said material, curved plate means connecting said spout and neck, a cylindrical rotor rotatably engaged by said plate means and disposed axially perpendicular to said funnel, neck and spout, said rotor having a cylindrical wall defining a compartment with a lateral opening therein, a flexible plate having one edge secured to one edge of said lateral opening, said plate means having a lateral slot, said flexible plate extending through said slot with a ridge on the other end of said plate outside of said compartment and plate means, said rotor having a knob handle extending axially outward of said plate means for manually turning the rotor, whereby said compartment is open to said funnel and neck to receive a predetermined quantity of granular material into said compartment in a first position of the rotor while said cylindrical wall seals off said compartment from said spout, whereby the compartment is closed off from said neck and funnel by said flexible plate overlaying said wall in a second position of said rotor while the compartment is open to said spout to discharge said quantity of material into the spout, and whereby said compartment is closed off from said spout by said wall and is closed off from said neck and funnel by said flexible plate overlaying said wall in a third position of said rotor, a cylindrical casing surrounding said funnel, neck, plate means and part of said spout to define therewith another compartment external of the rotor for hermetically sealing off the compartment in the rotor from the exterior of the casing, and a cylindrical flange extending upwardly from said funnel concentric with said casing to define a circumferential groove therebetween to receive an open end of an inverted container of said granular material.

11. A dispensing device for granular material, comprising a conical funnel for receiving said material from a container thereof, a rectangular neck connected to the funnel, a rectangular spout for discharging said material, curved plate means connecting said spout and neck, a cylindrical rotor rotatably engaged by said plate means and disposed axially perpendicular to said funnel, neck and spout, said rotor having a cylindrical wall defining a compartment with a lateral opening therein, a flexible plate having one edge secured to one edge of said lateral opening, said plate means having a lateral slot, said flexible plate extending through said slot with a ridge on the other end of said plate outside of said compartment and plate means, said rotor having a knob handle extending axially outward of said plate means for manually turning the rotor, whereby said compartment is open to said funnel and neck to receive a predetermined quantity of granular material into said compartment in a first position of the rotor while said cylindrical wall seals off said compartment from said spout, whereby the compartment is closed off from said neck and funnel by said flexible plate overlaying said wall in a second position of said rotor while the compartment is open to said spout to discharge said quantity of material into the spout, and whereby said compartment is closed off from said spout by said wall and is closed off from said neck and funnel by said flexible plate overlaying said wall in a third position of said rotor, said knob handle having a projection for engaging a stationary member in said first position of the rotor to limit rotation thereof in one direction, said ridge engaging said plate means at said slot in said second position of the rotor to limit rotation thereof in an opposite direction, a cylindrical casing surrounding said funnel, neck, plate means and part of said spout to define therewith another compartment external of the rotor for hermetically sealing off the compartment in the rotor from the exterior of the casing, and a cylindrical flange extending upwardly from said funnel concentric with said casing to define a circumferential groove therebetween to receive an open end of an inverted container of said granular material.

12. A dispensing device for granular material, comprising a conical funnel for receiving said material from a container thereof, a rectangular neck connected to the funnel, a rectangular spout for discharging said material, curved plate means connecting said spout and neck, a cylindrical rotor rotatably engaged by said plate means and disposed axially perpendicular to said funnel, neck and spout, said rotor having a cylindrical wall defining a compartment with a lateral opening therein, a flexible plate having one edge secured to one edge of said lateral opening, said plate means having a lateral slot, said flexible plate extending through said slot with a ridge on the other end of said plate outside of said compartment and plate means, said rotor having a knob handle extending axially outward of said plate means for manually turning the rotor, whereby said compartment is open to said funnel and neck to receive a predetermined quantity of granular material into said compartment in a first position of the rotor while said cylindrical wall seals off said compartment from said spout, whereby the compartment is closed off from said neck and funnel by said flexible plate overlaying said wall in a second position of said rotor while the compartment is open to said spout to discharge said quantity of said material into the spout, and whereby said compartment is closed off from said spout by said wall and is closed off from said neck and funnel by said flexible plate overlaying said wall in a third position of said rotor, and a spring-biased door hinged to the spout for closing the same, whereby said quantity of material can be discharged from said spout while the rotor is in said second position, said knob handle having a projection for engaging a stationary member in said first position of the rotor to limit rotation thereof in one direction, said ridge engaging said plate means at said slot in said second position of the rotor to limit rotation thereof in an opposite direction, a cylindrical casing surrounding said funnel, neck, plate means and part of said spout to define therewith another compartment external of the rotor for hermetically sealing off the compartment in the rotor from the exterior of the casing, and a cylindrical flange extending upwardly from said funnel concentric with said casing to define a circumferential groove therebetween to receive an open end of an inverted container of said granular material.

13. A dispensing device for granular material, comprising a conical funnel for receiving said material from a container thereof, a rectangular neck connected to the funnel, a rectangular spout for discharging said material, curved plate means connecting said spout and neck, a cylindrical rotor rotatably engaged by said plate means and disposed axially perpendicular to said funnel, neck and spout, said rotor having a cylindrical wall defining a compartment with a lateral opening therein, a flexible plate having one edge secured to one edge of said lateral opening, said plate means having a lateral slot, said flexible plate extending through said slot with a ridge on the other end of said plate outside of said compartment and plate means, said rotor having a knob handle extending axially outward of said plate means for manually turning the rotor, whereby said compartment is open to said funnel and neck to receive a predetermined quantity of granular material into said compartment in a first position of the rotor while said cylindrical wall seals off said compartment from said spout, whereby the compartment is closed off from said neck and funnel by said flexible plate overlaying said wall in a second position of said rotor while the compartment is open to said spout to discharge said quantity of material into the spout, and whereby said compartment is closed off from said spout by said wall and is closed off from said neck and funnel by said flexible plate overlaying said wall in a third position of said rotor, said knob handle having a projection for engaging a stationary member in said first position of the rotor to limit rotation thereof in one direction, said ridge engaging said plate means at said slot in said second position of the rotor to limit rotation thereof in an opposite direction, a first cylindrical flange extending upwardly from said funnel, and another cylindrical flange concentric with the first flange and defining a circumferential groove therebetween to receive an open end of an inverted container of said granular material.

14. A dispensing device for granular material, comprising a conical funnel for receiving said material from a container thereof, a rectangular neck connected to the funnel, a rectangular spout for discharging said material, curved plate means connecting said spout and neck, a cylindrical rotor rotatably engaged by said plate means and disposed axially perpendicular to said funnel, neck and spout, said rotor having a cylindrical wall defining a compartment with a lateral opening therein, a flexible plate having one edge secured to one edge of said lateral opening, said plate means having a lateral slot, said flexible plate extending through said slot with a ridge on the other end of said plate outside of said compartment and plate means, said rotor having a knob handle extending axially outward of said plate means for manually turning the rotor, whereby said compartment is open to said funnel and neck to receive a predetermined quantity of granular material into said compartment in a first position of the rotor while said cylindrical wall seals off said compartment from said spout, whereby the compartment is closed off from said neck and funnel by said flexible plate overlaying said wall in a second position of said rotor while the compartment is open to said spout to discharge said quantity of said material into the spout, and whereby said compartment is closed off from said spout by said wall and is closed off from said neck and funnel by said flexible plate overlaying said wall in a third position of said rotor, and a spring-biased door hinged to the spout for closing the same, whereby said quantity of material can be discharged from said spout while the rotor is in said second position, said knob handle having a projection for engaging a stationary member in said first position of the rotor to limit rotation thereof in one direction, said ridge engaging said plate means at said slot in said second position of the rotor to limit rotation thereof in an opposite direction, a first cylindrical flange extending upwardly from said funnel, and another cylindrical flange concentric with the first flange and defining a circumferential groove therebetween to receive an open end of an inverted container of said granular material.

15. A dispensing device for granular material, comprising a conical funnel for receiving said material from a container thereof, a rectangular neck connected to the funnel, a rectangular spout for discharging said material, curved plate means connecting said spout and neck, a cylindrical rotor rotatably engaged by said plate means and disposed axially perpendicular to said funnel, neck and spout, said rotor having a cylindrical wall defining a compartment with a lateral opening therein, a flexible plate having one edge secured to one edge of said lateral opening, said plate means having a lateral slot, said flexible plate extending through said slot with a ridge on the other end of said plate outside of said compartment and plate means, said rotor having a knob handle extending axially outward of said plate means for manually turning the rotor, whereby said compartment is open to said funnel and neck to receive a predetermined quantity of granular material into said compartment in a first position of the rotor while said cylindrical wall seals off said compartment from said spout, whereby the compartment is closed off from said neck and funnel by said flexible plate overlaying said wall in a second position of said rotor while the compartment is open to said spout to discharge said quantity of said material into the spout, and whereby said compartment is closed off from said spout by said wall and is closed off from said neck and funnel by said flexible plate overlaying said wall in a third position of said rotor, and a spring-biased door hinged to the spout for closing the same, whereby said quantity of material can be discharged from said spout while the rotor is in said second position, said knob handle having a projection for engaging a stationary member in said first position of the rotor to limit rotation thereof in one direction, said ridge engaging said plate means at said slot in said second position of the rotor to limit rotation thereof in an opposite direction, a first cylindrical flange extending upwardly from said funnel, and another cylindrical flange concentric with the first flange and defining a circumferential groove therebetween to receive an open end of an inverted container of said granular material, said slot extending outwardly to one edge of said plate means to permit axial passage of said flexible plate when said rotor is inserted axially into said plate means, and an arcuate strap on said plate means locking said rotor rotatably in said plate means.

References Cited by the Examiner

UNITED STATES PATENTS

| | | | |
|---|---|---|---|
| 934,182 | 9/09 | Jopling | 222—339 |
| 1,126,736 | 2/15 | Dutcher | 222—354 |
| 1,368,270 | 2/21 | Lissman | 222—355 |

FOREIGN PATENTS

| | | |
|---|---|---|
| 50,851 | 11/10 | Switzerland. |

LOUIS J. DEMBO, *Primary Examiner.*